May 31, 1966     E. B. TALBOT     3,253,819
COOLING TOWERS
Filed Dec. 7, 1962
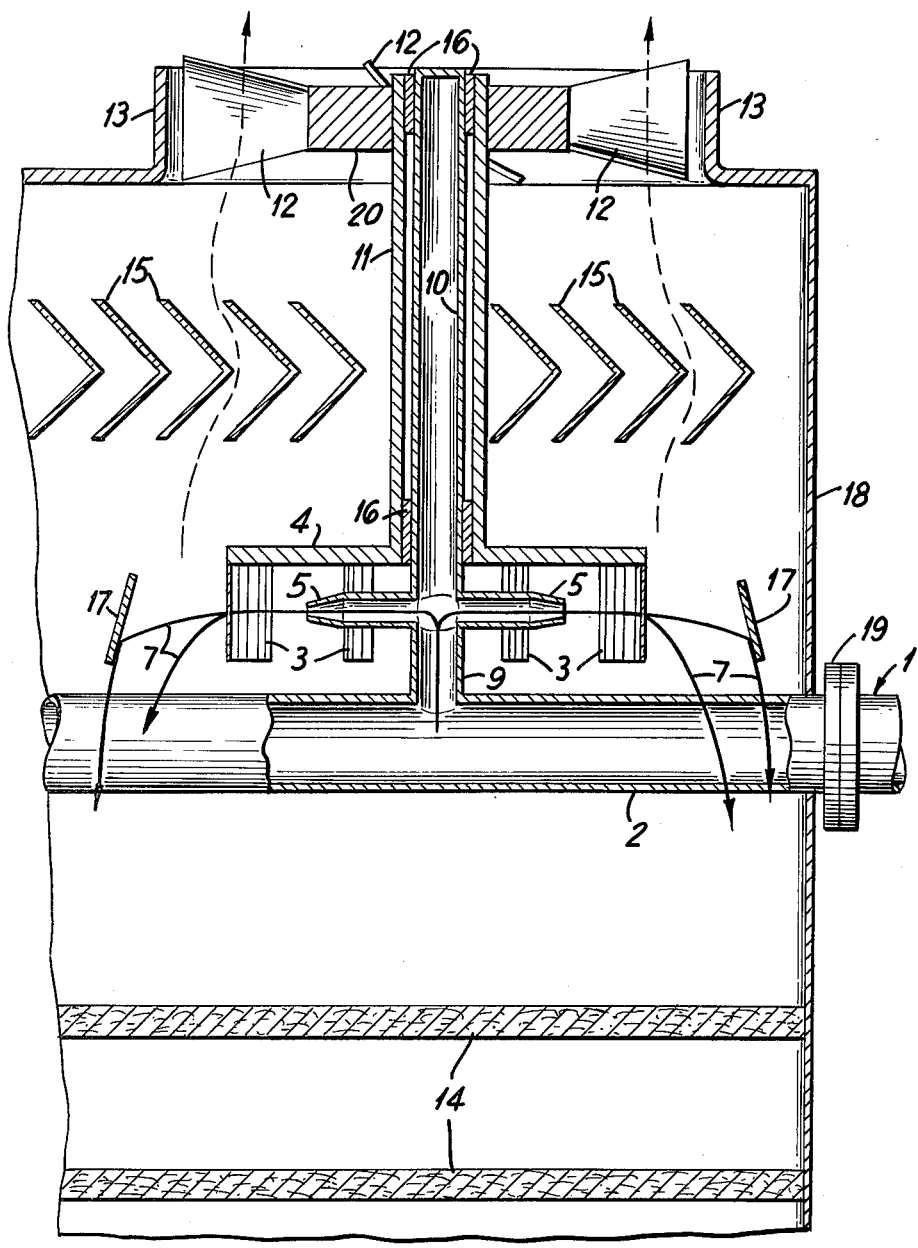
INVENTOR.
EDWARD B. TALBOT
BY
*Herbert Goodman*
ATTORNEY.

United States Patent Office 3,253,819
Patented May 31, 1966

3,253,819
COOLING TOWERS
Edward Butterfield Talbot, 9 Dryburgh Road,
Putney, London, England
Filed Dec. 7, 1962, Ser. No. 243,101
Claims priority, application Great Britain, Dec. 8, 1961,
44,089/61
4 Claims. (Cl. 261—25)

This invention relates to machinery for moving air and distributing water in water cooling towers.

It has been established that a satisfactory method of moving air in a water cooling tower is by placing a fan on the top of the water cooling tower and driving the fan by means of an electric motor or other form of prime mover while the water is distributed over the water cooling tower packing from a special pipe system. The disadvantage of this arrangement is that it is necessary to have elaborate electrical arrangements to power the electric motor and the electric motor is itself a complex piece of machinery necessitating frequent inspection and overhaul. A further disadvantage in the use of electric motors is that in many cases large motors and fans have to be used in order to move the air economically.

It is the object of this invention to provide means of moving the fan and distributing the water without the necessity of providing a complex means of powering the fan and additional equipment to distribute the water. It is also an object of this invention to eliminate the need to supply electricity to a water cooling tower for driving the fan. A further object is to provide an easy means of regulating the speed of the fan so that the amount of air drawn through the water cooling tower is adjusted in accordance with the heat load on the water cooling tower in order to achieve the maximum economy in operation. Another object of the invention is to provide a process for moving air and distributing water through cooling towers.

The drawing shows a sectional elevation of the fan and water turbine assembly in part of a cooling tower.

The invention consists broadly of a fan powered by a water turbine, such turbine being essentially part of the water distribution system on the cooling tower. It is a further preferred feature of the invention that the turbine may be separated some little distance from the fan so that the drift eliminators, which are devices to remove entrained moisture from the air of the cooling tower, may be located between the fan and the water turbine. It is a further feature of the invention that the fan rotates on a sleeve about a shaft which is essentially an extension of the water distribution system such arrangement being achieved by passing the water from the water distribution system through radially disposed water passages arranged to impinge the water on the blades of the water turbine in the manner of a water turbine impulse wheel known to engineers as a Girard impulse water turbine. It should be noted that other devices of moving a fan by means of a water turbine have previously been proposed but in all cases the water turbine has been of a type known to engineers as a Pelton wheel impulse water turbine or, alternatively, a reaction water turbine. In both these cases it is not possible to construct the water flow passages in such a manner that the water turbine is also an integral part of the water distribution system and, as a result, the designs do not achieve the simplicity and adaptability suitable for use in applications requiring many small diameter fans with a simple distribution system for the water.

The specific form the invention takes in practice is that of an axial flow fan mounted with its blades in a horizontal plane connected by a sleeve to the moving part of the water turbine. The whole is located so that the aforementioned sleeve may rotate about a shaft or pipe projecting from the water distribution system of the cooling tower. Extending from the shaft or pipe projecting from the water distribution system are one or more water passages arranged so that water, after leaving the aforementioned water passages, impinges on the blades of the water turbine. The water may be collected in a suitable annular container surrounding the water turbine blades and led away for distribution over the packing of the cooling tower or, alternatively, it may be allowed to spread after leaving the water turbine, with or without the aid of suitable baffles, over the packing within the cooling tower. The use of this arrangement permits the economic fabrication of small diameter fans so that the complexity associated with large diameter fans is eliminated.

While the principal application of this device will be in cooling towers, its use is by no means restricted to this field. It may also be used for moving air in other devices requiring the movement of air by axial flow fans such as air cooled heat exchangers, biological oxidation units, fume extractors and chemical plants, absorption towers for the removal of gases and the like. A centrifugal fan may also be substituted for the axial flow fan in any or all of these applications.

The invention will be more clearly understood with reference to the accompanying drawing and detailed description. The figure shows a sectional elevation of a typical fan and water turbine assembly in part of a water cooling tower. The water enters the cooling tower by means of the pipe 1 which is attached to the water distribution system inlet flange 19 and passes along a pipe 2 on which are situated one or more connections 9. These connections allow the water to pass into the water passages 5 which are located at a suitable angle so as to impinge on the blades 3 of the impulse wheel 3. The impulse wheel blades 3 are curved in such a manner that the water flowing from the water passages 5 causes the blades 3 to rotate in either a clockwise or anti-clockwise direction in accordance with the desired result. The water leaves the blades 3 along a trajectory path 7 and in the case illustrated may fall by gravity to impinge directly on the packing 14 or may be deflected by baffles 17 down on to the packing 14. Alternatively, a shroud may be fitted round the turbine blades 3 to collect the water so that it may be guided directly on to the packing. The turbine blades 3 are connected by suitable arms 4 or by an equivalent impulse wheel to an annular sleeve 11 which can rotate concentrically about the shaft or pipe 10 on the bearings 16. Alternatively, the sleeve 11 may be eliminated and the water turbine blades 3 may project directly from the hub 20 of the fan. At or near one end of the sleeve 11 is fixed a fan or fan blades 12 so that the fan 12 rotates in the same direction as the turbine blades 3. By this means air is moved through the shell of the cooling tower 18 over the packing 14 and thence through the drift eliminators 15 arranged so as to remove surplus moisture from the air and finally ejected from the cooling tower by means of the fan duct 13. It will be noted in the illustration that the fan 12 is positioned above the drift eliminators and the water turbine 3 is located below the drift eliminators. However, this is only one possible arrangement and the fan and turbine may be both arranged either under or above the drift eliminators. In the case of the latter arrangement when the fan and turbine are above the drift eliminators, it will then be essential to provide a shroud for the water turbine to collect the water for distribution over the packing 14. Again a shroud may be arranged round the turbine blades 3 when the water turbine is located below the drift eliminators 3 should these be desirable in arranging for water distribution over the packing. It should be noted that the shaft or pipe 10 may be hollow or solid and water access beyond the water passages 5 into the shaft or pipe 10 is entirely optional.

The use of the fan-turbine combination of the instant invention is especially suited for cooling tower use due to the relative proportions of air and water normally experienced in a cooling tower. This largely dictates the head required to provide the necessary power. The speed of the fan is regulated by the head which governs the amount of water through the turbine. Cooling towers utilizing a number of small diameter fan-turbines of this invention are economical in capital cost and maintenance.

As many embodiments of this invention may be made without departing from the spirit and scope thereof, it is to be understood that the invention includes all such modifications and variations as come within the scope of the appended claims.

What I claim is:

1. A gas-liquid contact device comprising a gas-liquid contact tower containing packing and having positioned above said packing, at least one gas-moving device comprising fan blades attached to a water turbine, said water turbine having
   (i) a rotatable impulse wheel with impulse blades protruding therefrom, and
   (ii) a hollow central stationary shaft, said shaft having means for introducing water into said shaft, and having outwardly extending nozzles positioned in alignment with said impulse blades whereby water from said shaft is directed to impinge on said impulse blades thereby causing said blades and the impulse wheel to rotate, said impulse wheel having an axial opening, the forming surfaces of said axial opening surrounding said stationary shaft and rotatable about said shaft, and said fan blades being rigidly connected to said impulse wheel whereby rotation of said impulse wheel causes said fan blades to rotate.

2. The device of claim 1 wherein said fan blades are connected to a hub, said hub being in a plane parallel to said impulse wheel and spaced from said impulse wheel by an axial sleeve surrounding said stationary shaft and being rotatable about said shaft.

3. The device of claim 1 wherein said fan blades are horizontal blades.

4. The gas-liquid contact device of claim 1 containing a plurality of said gas-moving devices.

References Cited by the Examiner

UNITED STATES PATENTS

| | | | |
|---|---|---|---|
| 469,589 | 2/1892 | Pack | 253—172 |
| 791,244 | 5/1905 | Carpenter et al. | 253—136 X |
| 927,766 | 7/1909 | Bauer. | |
| 1,051,661 | 1/1913 | Anderson. | |
| 1,079,087 | 11/1913 | Wilson. | |
| 2,060,414 | 11/1936 | Fladeland | 253—33 |
| 2,672,328 | 3/1954 | Mart et al. | 261—25 |
| 3,141,909 | 7/1964 | Mayo | 261—25 |

FOREIGN PATENTS 25,053 11/1908 Great Britain.

ROBERT F. BURNETT, *Primary Examiner.*

HARRY B. THORNTON, *Examiner.*

L. H. McCARTER, T. R. MILES, *Assistant Examiners.*